United States Patent
Megiddo

(10) Patent No.: US 7,117,130 B1
(45) Date of Patent: Oct. 3, 2006

(54) METHOD FOR SOLVING STOCHASTIC CONTROL PROBLEMS OF LINEAR SYSTEMS IN HIGH DIMENSION

(75) Inventor: Nimrod Megiddo, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 1149 days.

(21) Appl. No.: 09/607,513

(22) Filed: Jun. 28, 2000

(51) Int. Cl.
*G06F 17/10* (2006.01)

(52) U.S. Cl. .................. 703/2; 700/29; 700/102; 700/44; 706/12; 706/13

(58) Field of Classification Search ............ 703/2, 703/6; 700/107, 102, 29, 44; 705/7, 8; 716/11; 717/156; 706/12, 13; 345/622, 441; 707/3; 704/9; 379/221; 370/230; 382/103, 107
See application file for complete search history.

(56) References Cited

U.S. PATENT DOCUMENTS

| | | | | |
|---|---|---|---|---|
| 5,971,585 | A * | 10/1999 | Dangat et al. | 700/102 |
| 6,041,267 | A * | 3/2000 | Dangat et al. | 700/107 |
| 6,064,819 | A * | 5/2000 | Franssen et al. | 717/156 |
| 6,151,582 | A * | 11/2000 | Huang et al. | 705/8 |
| 6,189,132 | B1 * | 2/2001 | Heng et al. | 716/11 |
| 6,341,266 | B1 * | 1/2002 | Braun | 705/7 |
| 6,671,673 | B1 * | 12/2003 | Baseman et al. | 705/7 |

OTHER PUBLICATIONS

Viniotis et al., "Linear Programming as a technique for optimization of queueing systems", IEEE 1988.*
Schneider et al., "Stochastic production scheduling to meet demand forecasts", IEEE 1998.*
Hedlund, et al., "Optimal control of hybrid systems", IEEE 1997.*
Lasserre, "Average optimal stationary policies and linear programming in countable space Markov decision processes", IEEE 1992.*
J. Filar and K. Vrieze, "Competitive Markov Decision Process," Springer-Verlag, pp. 1-6 (1996).
R. Bellman, "Dynamic Programming," Princeton University Press, pp. 3-5, 317-318 (1957).
M.L. Puterman, "Markov Decision Processes: Discrete Stochastic Dynamic Programming," John Wiley and Sons, Inc., pp. 142-143 (1994).
G.J. Gordon, "Approximate Solutions to Markov Decision Processes," Doctoral dissertation, School of Computer Science, Carnegie Mellon University, pp. 1-140 (1999).

* cited by examiner

*Primary Examiner*—Paul Rodriguez
*Assistant Examiner*—Kandasamy Thangavelu
(74) *Attorney, Agent, or Firm*—Gates & Cooper LLP

(57) ABSTRACT

Stochastic control problems of linear systems in high dimensions are solved by modeling a structured Markov Decision Process (MDP). A state space for the MDP is a polyhedron in a Euclidean space and one or more actions that are feasible in a state of the state space are linearly constrained with respect to the state. One or more approximations are built from above and from below to a value function for the state using representations that facilitate the computation of approximately optimal actions at any given state by linear programming.

36 Claims, 2 Drawing Sheets

METHOD FOR SOLVING STOCHASTIC CONTROL PROBLEMS OF LINEAR SYSTEMS IN HIGH DIMENSION

BACKGROUND OF THE INVENTION

1. Field of the Invention

The present invention relates generally to a method for solving stochastic control problems of linear systems in high dimensions.

2. Description of Related Art (Note: This application references a number of different publications as indicated throughout the specification by reference numbers enclosed in brackets, e.g., [x]. A list of these different publications ordered according to these reference numbers can be found in the Section entitled "References" in the "Detailed Description of the Preferred Embodiment." Each of these publications is incorporated by reference herein.)

Computer-implemented Supply Chain Management (SCM) applications are designed to link a cohesive production and distribution network and thus allow an enterprise to track and streamline the flow of materials and data through the process of manufacturing and distribution to customers. SCM applications represent a significant evolution from previous enterprise resource planning (ERP) systems One goal of SCM applications is to decrease inventory costs by matching production to demand. SCM applications utilize extremely complex forecasting and planning algorithms to predict demand based upon information stored in the enterprise's database. These applications also incorporate any changes in supply chain data into the forecast much faster than previous modes of calculation, allowing enterprises to more accurately predict demand patterns and schedule production accordingly.

Another goal of SCM applications is to reduce overall production costs by streamlining the flow of goods through the production process and improving information flow between the enterprise, its suppliers, and its distributors. Logistics-oriented systems, such as transportation, warehouse management, and factory scheduling applications, all contribute to reduced production costs. By ensuring real-time connectivity between the various parties in a supply chain, these applications decrease idle time, reduce the need to store inventory, and prevent bottlenecks in the production process.

Yet another goal of SCM applications is to improve customer satisfaction by offering increased speed and adaptability. SCM applications allow the enterprise to reduce lead times, increase quality, and offer greater customization, enhancing the customer relationship and improving retention.

SCM applications begin with forecasting and data mining applications analyzing information consolidated in the enterprise's database. Planning algorithms are used to generate a demand forecast upon which to base subsequent procurement orders and production schedules.

Nonetheless, there is a need in the art for improved planning techniques for SCM applications, especially where a SCM application models a Markov Decision Process (MDP), and the action space and the state space of the MDP model are continuous and related to each other through a system of linear constraints.

SUMMARY OF THE INVENTION

To overcome the limitations in the prior art described above, and to overcome other limitations that will become apparent upon reading and understanding the present specification, the present invention discloses a method, apparatus, and article of manufacture for solving stochastic control problems of linear systems in high dimensions by modeling a structured Markov Decision Process (MDP). A state space for the MDP is a polyhedron in a Euclidean space and one or more actions that are feasible in a state of the state space are linearly constrained with respect to the state. One or more approximations are built from above and from below to a value function for the state using representations that facilitate the computation of approximately optimal actions at any given state by linear programming.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention relates to structured Markov Decision Processes (MDP) where the state space is a polyhedron in a Euclidean space and the actions that are feasible in a state are linearly constrained with respect to the state. The present invention builds approximations from above and from below to the value function, using representations that facilitate the computation of approximately optimal actions at any given state by linear programming.

Environment

Figure 1:
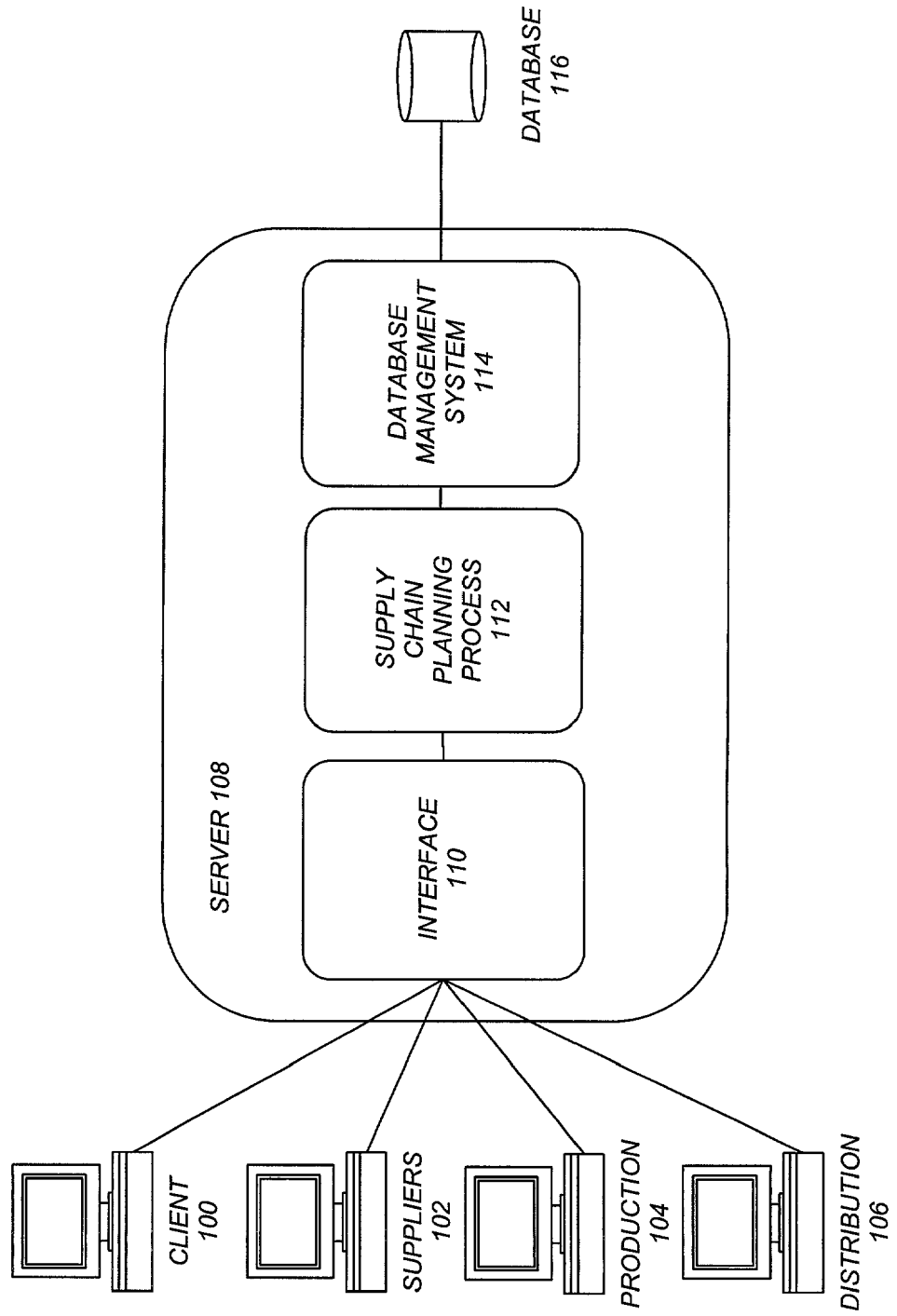
FIG. 1 is a block diagram illustrating an exemplary hardware environment used to implement the preferred embodiment of the present invention.

FIG. 1 is a block diagram illustrating an exemplary environment used to implement the preferred embodiment of the present invention. One or more client computers 100, supplier systems 102, production systems 104, and/or distribution systems 106 communicate with a server computer 108. Each of the client computers 100, supplier systems 102, production systems 104, distribution systems 106, and the server computer 108 are typically comprised of one or more processors, memory, and other components, such data storage devices and data communications devices.

The client computers 100, supplier systems 102, production systems 104, and/or distribution systems 106 typically execute one or more computer programs operating under the control of an operating system. These computer programs transmit requests to the server computer 108 for performing various functions and receive data from the server computer 108 in response to the requests.

The server computer 108 also operates under the control of an operating system, and executes one or more computer programs, such as an interface 110, supply chain planning process 112, and database management system 114. The interface 110, supply chain planning process 112, and database management system 114 perform various functions related to supply chain management (or other applications), and may transmit data to the client computers 100, supplier systems 102, production systems 104, and/or distribution systems 106.

The server computer 108 manages one or more databases 116 stored on one or more data storage devices. In a preferred embodiment, the databases 116 store one or more vectors used by the supply chain planning process 112, such as resource vectors, cost vectors, action vectors, and other vectors. These vectors may be generated, inter alia, by an enterprise resource planning (ERP) system, a point-of-sale (POS) system, or a manufacturing supply and distribution (MSD) system. Those skilled in the art will recognize, however, that other embodiments may use different databases, or different programs to access the databases.

Generally, the interface 110, supply chain planning process 112, database management system 114, and database 116 each comprise logic and/or data that is tangibly embodied in or retrievable from a computer-readable device, medium, carrier, or signal, e.g., a data storage device, a remote device accessible via a data communications device, etc. Moreover, these logic and/or data, when read, executed, and/or interpreted by the server computer 108, cause the server computer 108 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Supply Chain Planning Process

In the preferred embodiment, the supply chain planning process 112 preferably comprises a Markov Decision Process (MDP). MDPs were introduced by Bellman [1], and can be abstractly described as follows. The state of a system changes, alternately, by random transitions and by chosen actions. Before applying a chosen action, if the system is in state s, then an action $x \in X(s)$ (wherein $X(s)$ is the set of possible actions at s) can be taken at a cost of $c(x)$, and then the state of the system changes to $s'=g(s,x)$. A policy is an assignment of an action $x=x(s)$ to each state s. If, before a random transition, the system is in state s, then the subsequent state is a random variable S whose probability distribution depends only on s: $Pr(S=s'|s)=p(s,s')$. Given an initial state s, a policy induces a sequence of random variable costs $C_1, C_2, \ldots$ corresponding to the (a priori random) actions $X^1, X^2, \ldots$ mandated by the policy, i.e., $C_i=c(X^i)$. The total discounted cost is a random variable $$C = \sum_{i=1}^{\infty} \lambda^i C_i$$

where $0<\lambda<1$ is a given constant, called a discount factor. An optimal policy is one that minimizes the expected total discounted cost E[C] for any given initial state. The value of a state s is the minimum of E[C], starting at s (and applying a random transition first) over all the possible policies. The value function L(s) assigns to each state s the minimum possible expected total discounted cost, where the initial state is s, and the system first undergoes a random transition, followed by transition caused by a chosen action.

The size of the state space is a major obstacle for the practicality of MDP. If the optimal policy has to be computed explicitly in advance, then obviously, the number of states should be quite limited. Usually, it suffices to compute the value function, but still, if all the possible states have to be handled explicitly, then the number of states must be limited to several millions. This number is quite small when the state space is generated by some state variables. In particular, if the state variables are continuous, then any reasonable discretization of them would give rise to an enormous number of states that would prohibit solution by the standard methods of discrete MDP (see Puterman [4]).

Other approaches to the problem are surveyed in Gordon [3]. The model discussed in Gordon [3] and the solution approach rely heavily on linear programming. They, however, should not be confused with other applications of linear programming methods for solving MDP, either exactly or approximately, for example (see, Trick and Zin [5]).

The present invention considers a model where the action space and the state space are continuous and related to each other through a system of linear constraints. This is the case in real life systems of supply chain management. It can be shown that the value function is convex and this important characteristic can be exploited for efficiently "learning" the value function in advance and representing it in a way that allows for real-time choice of actions based on it. The function is approximated both from above and from below by piecewise linear and convex functions. The domains of linearity of these functions are not stored explicitly, since such a representation would prohibit solutions in high dimension. Yet, linear programming formulation allows optimizing and updating these functions in real-time.

The Underlying Process

The specific process considered herein is described as follows. States are described by real m-vectors, and actions are described by real n-vectors. At a state s, the system first undergoes a transition to a state s+b where b is a random vector from a certain probability distribution over $\mathfrak{R}^m$. Furthermore, b is (stochastically) independent of s. The action $x \in \mathfrak{R}^n$ and the state $s' \in \mathfrak{R}^n$ of the system after x is taken must satisfy the following constraints:

$s'=s+b-Ax$ $Ms' \geq a$ and $Dx \geq d$ where $A \in \mathfrak{R}^{m \times n}$, $b \in \mathfrak{R}^m$, and M, D, a and d are arrays of consistent dimensions. Thus, s' is determined by x and s.

Taking an action x costs $c^T x$ (where the superscript T stands for matrix transposition). The cost vector c may itself be drawn from a probability distribution.

Consider the following example. One application of the model is in terms of a dynamic production problem. Suppose a manufacturer optimizes profit by minimizing $c^T x$ subject to $Ax \leq q$. This is the classical (one stage) product mix problem. This problem generalizes as follows. Suppose, after each production stage, the vector of available resources q is updated. More precisely, suppose, at the end of a production stage, the leftover amounts of resources are given in a vector s. Next, additional amounts, given in a vector b, become available, so the resources available for the next stage are given in the vector s+b. If the new production plan is given by x, then the leftover amounts after the next stage are given by s', where $Ax+s'=s+b$. In addition to that, x and s' may have to satisfy some linear constraints. A myopic approach to the problem would choose x so as to minimize $c^T x$ subject to $Ax+s'=s+b$, $Ms' \geq a$ and $Dx \geq d$, ignoring the value of leftover resources for the future. If the value function $L(\cdot)$ is known, then an optimal policy would minimize in each stage the objective function $c^T x + \lambda L(s')$ subject to the above constraints.

For any state s, let F(s) denote the set of all the pairs (x,s') such that $Ax+s'=s$, $Ms' \geq a$ and $Dx \geq d$. The Bellman [1] optimality equation characterizes the value function:

$$L(s) = E_{bc}[\min\{c^T x + \lambda L(s') | (x,s') \in F(s+b)\}]$$

where $E_{bc}$ denotes the expectation operator with respect to the distribution of the change vector b and the cost vector c.

Convexity of the Value Function

In this section, it will be proved that the function $L(\cdot)$ is convex.

Let any sequence $b^0, b^1, b^2, \ldots$ of realizations of the state change vectors (corresponding to the time stages) be fixed, let any sequence $c^0, c^1, c^2, \ldots$ of realizations of the cost vectors (corresponding to the time stages) be fixed, and let an optimal policy be fixed. Given an initial state $s^0$ and assuming the first change is by a random transition, the future (i.e., the states and actions) is now completely determined and the total discounted cost is equal to:

$$V(s^0; b, c) = \sum_{i=0}^{\infty} \lambda^i (c^i)^T x^i$$

where $x^0, x^1, x^2, \ldots$ are the action vectors, necessarily satisfying $Dx^i \geq d$. Furthermore, a sequence of state vectors $s^0, s^1, s^2, \ldots$ is also determined, which satisfies $Ax^i + s^{i+1} = s^i + b^i$ and $Ms^i \geq a$. Another initial state $t^0$ would generate different sequences of action vectors $y^0, y^1, y^2, \ldots$ and state vectors $t^0, t^1, t^2, \ldots$ so that:

$$V(t^0; b, c) = \sum_{i=0}^{\infty} \lambda^i (c^i)^T y^i$$

and $Ay^i + t^{i+1} = t^i + b^i$, $Mt^i \geq a$ and $Dy^i \geq d$. Given any $0 < \alpha < 1$, consider the initial state $(1-\alpha)s^0 + \alpha t^0$. The sequence of action vectors $z^i = (1-\alpha)x^i + \alpha y^i$ and state vectors $u^i = (1-\alpha)s^i + \alpha t^i$ also satisfy the constraints: $Az^i + u^{i+1} = u^i + b^i$, $Mu^i \geq a$ and $Dz^i \geq d$, and the resulting total discounted cost is equal to:

$$\sum_{i=0}^{\infty} \lambda^i (c^i)^T z^i = (1-\alpha) V(s^0; b, c) + \alpha V(t^0; b, c)$$

By taking expectations over b and c on both sides of the latter, $$E\left[\sum_{i=0}^{\infty} \lambda^i (c^i)^T z^i\right] \leq (1-\alpha) L(s^0) + \alpha L(t^0)$$

is obtained. The value on the left-hand side corresponds to a policy that may not be stationary, but since there exists an optimal stationary policy, it follows that its value cannot be smaller than $L(u^0)$. Thus, $L(u^0) \leq (1-\alpha)L(s^0) + \alpha L(t^0)$. This completes the proof of convexity.

In view of the convexity of L(s), it can be efficiently approximated both from above and from below. Both approximations can be repeatedly refined both during preprocessing and online.

Approximating the Value Function from Above

The approximation from above is based on knowledge of upper bounds on L(s) at each member of some manageable set of states. Suppose it has been concluded that for certain state vectors $u^1, \ldots, u^k$, $L(u^i) \leq f_i (i=1, \ldots, k)$. Then, convexity implies that for any nonnegative $y=(y_1, \ldots, y_k)^T$ such that $\Sigma_i y_i = 1$, necessarily, $L(\Sigma_{i=1}^k y_i u^i) \leq \Sigma_{i=1}^k y_i f_i$. Thus, for any given state s, the least upper bound on L(s) that can be derived from $f=(f_1, \ldots, f_k)^T$ by convexity, which is denoted by $\overline{L}_f(s)$, can be obtained by solving a linear programming problem as follows.

Denote $U=[u^1, \ldots, u^k] \in \Re^{m \times k}$ and $e=(1, \ldots, 1)^T \in \Re^k$. Then, solve:

$$\begin{aligned}
\text{Minimize} \quad & f^T y \quad &(P1)\\
y & \\
\text{subject to} \quad & Uy = s \\
& e^T y = 1 \\
& y \geq 0
\end{aligned}$$

A nice feature of this approximation is that there is no need to derive such least upper bounds ahead of time. The problem (P1) can be embedded in a larger linear programming problem that determines an approximately optimal action. Specifically, if the upper bounds are sufficiently close to L, then an approximately optimal action at a state s+b can be calculated by solving the following:

$$\begin{aligned}
\text{Minimize} \quad & c^T x + \lambda f^T y \quad &(P2)\\
x, y & \\
\text{subject to} \quad & Ax + Uy = s + b \\
& MUy \geq a \\
& Dx \geq d \\
& e^T y = 1 \\
& y \geq 0.
\end{aligned}$$

The problem (P2) can be solved for any choice of the vectors b and c. If the latter are sampled sufficiently many times from the given probability distribution, then an updated approximate value function can be obtained for L(s) as follows. Denote by H(s;b,c) the optimal value of (P2), and denote by J(s;b,c) the minimum of $c^T x + \lambda L(s')$ subject to $(x,s') \in F(s+b)$. Obviously, $J(s;b,c) \leq H(s;b,c)$, so $L(s) = E_{bc}[J(s;b,c)] \leq E_{bc}[H(s;b,c)]$. If $\{b^1, c^1, \ldots, b^r, c^r\}$ is an adequate random sample, consider the values $H(s;b^i,c^i)$, and based on them calculate a high-confidence upper bound $\rho$ on $E_b[J(s;b,c)]$. If $\rho < L_f(s)$, then s can be added to the set of states, by setting $s_{k+1} = s$ and $f_{k+1} = \rho$. When desired, some $s^i$ may be dropped when their corresponding $f_i$ values are implied by the values of other states, as evident by solving a problem like (P1).

Convergence

Now, it can be proven that if the approximation from above cannot be improved by deriving more bounds from solutions of (P2), then the current approximation is exact. Thus, suppose for every state s:

$$\overline{L}(s) \equiv E_{bc}[H(s;b,c)] \geq L_f(s)$$

It follows that for the states $u^i$ in the current formulation:

$$f_i = E_{bc}[H(u^i;b,c)] = \overline{L}(u^i)$$

and for any state s', if in an optimal solution of (P2), s'=Uy, $e^T y = 1$, and $y \geq 0$, then also:

$$\overline{L}(s') \equiv f^T y = \sum_i y_i \overline{L}(u^i)$$

It follows that the function $\overline{L}$ satisfies the Bellman equation:

$$\overline{L}(s) = E_{bc}\left[\min_{x,s'}\{c^T x + \lambda \overline{L}(s')\}\right]$$

Let $\overline{x}(s;b,c)$ and $\overline{s}'(s;b,c)$ denote optimal choices at s+b, given c, relative to the function $\overline{L}$ and let x(s;b,c) and s'(s;b,c) denote the optimal choices at s+b relative to the function L. Thus:

$$\overline{L}(s) = E_{bc}[c^T \overline{x}(s;b,c) + \lambda \overline{L}(\overline{s}'(s;b,c))] \leq E_{bc}[c^T x(s;b,c) + \lambda \overline{L}(s'(s;b,c))]$$

and:

$$L(s) = E_{bc}[c^T x(s;b,c) + \lambda L(s'(s;b,c))]$$

It follows that:

$$0 \leq \overline{L}(s) - L(s) \leq E_{bc}[c^T x(s; b, c) + \lambda \overline{L}(s'(s; b, c))] - E_{bc}[c^T x(s; b, c) + \lambda L(s'(s; b, c))]$$
$$= \lambda(E_{bc}[\overline{L}(s'(s; b, c)] - E_{bc}[L(s'(s; b, c)]).$$

Assuming the state space is bounded, the latter implies $\overline{L}(s) = L(s)$, since otherwise a contradiction is obtained by choosing s so that $\overline{L}(s) - L(s)$ is sufficiently close to the supremum of this difference over the state space.

Approximating the Value Function from Below

The approximation from below is based on knowledge of linear functions that lie below the convex function L(s). Suppose $v^1, \ldots, v^r \in \Re^m$ and $g_1, \ldots, g_r \in \Re$ are such that for every s that satisfies $Ms \geq a$:

$$L(s) \geq l_i(s) \equiv (v^i)^T s + g_i (i=1, \ldots, r)$$

Then, the maximum $\underline{L}(s) = \max_i\{l_i(s)\}$ is a convex function that bounds L(s) from below.

An Alternate Value Function

Because of the alternating nature of the process, i.e., alternating between chosen actions and random transitions, there is an alternative way to define values of states, which turns out to be helpful in the case of approximation from below. First, denote:

$$K(s;c) = \min\{c^T x + \lambda L(s') | (x,s') \in F(s)\}$$

so that:

$$L(s) = E_{bc}[K(s+b;c)]$$

It is easy to see that K(s;c) is the minimum possible expected total discounted cost, given c, when the starting state is s and the first change is induced by a chosen action rather than by a random transition. The Bellman [1] optimality equation, therefore, can be written in terms of K in the form:

$$K(s;c) = \min\{c^T x + \lambda E_{bc'}[K(s'+b;c')] | (x,s') \in F(s)\}$$

Convexity

The proof of convexity of the function K(s;c) (for a fixed c) is similar to that of L(s). Fix any sequence $b^0, b^1, b^2, \ldots$ of realizations of the state change vectors (except that $b^0 = 0$), fix any sequence $c^0, c^1, c^2, \ldots$ of cost vectors, and fix an optimal policy. An initial state $s^0$ now determines the future states and actions, and therefore:

$$V(s^0; b, c) = \sum_{i=0}^{\infty} \lambda^i (c^i)^T x^i$$

where the action vectors satisfy $Dx^i \geq d$, $Ax^i + s^{i+1} = s^i + b^i$ and $Dx^i \geq d$. Another initial state $t^0$ has:

$$V(t^0; b, c) = \sum_{i=0}^{\infty} \lambda^i (c^i)^T y^i$$

with $Ay^i + t^{i+1} = t^i + b^i$, $Mt^i \geq a$, and $Dy^i \geq d$. It can be deduced that:

$$V((1-\alpha)s^0 + \alpha t^0; b, c) \leq (1-\alpha)V(s^0; b, c) + \alpha V(t^0; b, c)$$

for every $0 < \alpha < 1$, and convexity is established by taking expectations over the sequences of $b^i$'s and $c^i$'s.

Bounds from Duality

Now, the lower bounds on K(s;c) can be derived based on the linear functions $l_i(s)$. Denote $V^T = [v^1, \ldots, v^r] \in \Re^r$. Let $\xi$ be scalar, and denote the optimal value of the following linear programming problem by $\underline{K}(s; c)$:

$$\text{Minimize} \quad c^T x + \lambda \xi \quad \text{(P3)}$$
$$x, s', \xi$$
$$\text{subject to} \quad Ax + s' = s$$
$$Ms' \geq a$$
$$Dx \geq d$$
$$\xi e - Vs' \geq g$$

Obviously, at an optimal solution, has the value of $L(s') = \max_i \{(v^i)^T s' + g_i\} \leq L(s')$. It follows that $\underline{K}(s;c) \leq K(s;c)$, but further information can be derived by considering the dual problem of (P3), i.e.:

$$\text{Minimize} \quad s^T y + a^T z + d^T w + g^T p \quad \text{(D3)}$$
$$y, z, w, p$$
$$\text{subject to} \quad A^T y + D^T w = c$$
$$y + M^T z - V^T p = 0$$
$$e^T p = \lambda$$
$$z, w, p \geq 0$$

The function $\underline{K}(s;c)$ is piecewise linear and convex since the feasible domain of (D3) is independent of s, and the maximum is always attained at a feasible basis; so, $\underline{K}(s;c)$ is the maximum of linear functions of s corresponding to feasible bases of (D3). Let $y=y(\hat{s};c)$, $z=z(\hat{s};c)$, $w=w(\hat{s};c)$ and $p=p(\hat{s};c)$ denote the optimal solution of (D3) when $s=\hat{s}$. Since this solution is feasible for every s, it follows that for every s, because $\underline{K}(s;c)$ is also the maximum value (D3), the following holds:

$$K(s;c) \geq \underline{K}(s;c) \geq y^T s + a^T z + d^T w + g^T p$$

Replacing s by s+b, the latter can also be expressed by stating that for every s and b:

$$K(s+b;c) \geq y^T s + y^T b + a^T z + d^T w + g^T p$$

Now, let $v^{r+1} = E_c[y]$, and let:

$$g_{r+1} = E_{bc}[y^T b] + a^T z + d^T w + g^T p$$

so that:

$$E_{bc}[K(s+b;c)] = (v^{r+1})^T s + g_{r+1}$$

Since $L(s) = E_b[K(s+b;c)]$, it follows that $L(s) \geq l_{r+1}(s) \equiv (v^{r+1})^T s + g_{r+1}$.

If b and c are stochastically independent, then the expectation $E_{bc}[y^T b]$ can be easily calculated as $\Sigma_i E[y_i] E[b_i]$, and each $E[b_i]$ can be estimated in advance.

If $\underline{L}(s)$ is sufficiently close to $L(s)$, then an approximately optimal action at a state s+b can also be calculated by solving (P3).

Convergence

Denote:

$$\underline{L}_r(s) = \max_{1 \leq i \leq r} \{l_i(s)\}$$

and suppose the (r+1)th linear function is obtained while $\hat{s}$ is the next state that is calculated while solving (P3), i.e.:

$$l_{r+1}(s) = l_{r+1}(s;\hat{s}) = v^{r+1}(\hat{s})s + g^{r+1}(\hat{s})$$

and $l_{r+1}(s;\hat{s})$ is the optimal value of (P3). Then:

$$\underline{L}_{r+1}(s) = \max\{\underline{L}_r(s), l_{r+1}(s)\}$$

Obviously, as long as there exist $\hat{s}$ and s such that $l_{r+1}(s;\hat{s}) \geq \underline{L}_r(s)$, then a better approximate value function $\underline{L}_{r+1}(s)$ can be obtained. Otherwise, further iterations from below would result in the same approximate value function $\underline{L}_r(s)$.

Denote $\underline{L}(s) = E_{bc}[\underline{K}(s+b;c)]$ and suppose that (P3) cannot improve the approximation from below at any state, that is, for every s, $\underline{L}(s) \leq \underline{L}_r(s)$. It can now be shown that in this case $\underline{L}_r(s)$ is indeed the correct value $L(s)$. By definition, $\underline{K}(s;c)$ is obtained by solving (P3), which also determines a certain policy $x=x(s;c)$ and a certain next state $s'=s'(s;c)$. Denote by $\pi(s;c)$ the expected total discounted cost, starting at s with cost vector c (just before an action has to be chosen) and using the policy $x(.)$. Then, for all s:

$$\pi(s;c) = c^T x(s) + \lambda E_{bc}[\pi(s'(s;c) + b;c')]$$

It follows that for all s:

$$\underline{L}_r(s) - E_c[\pi(s;c)] \geq \lambda \cdot E_{bc}[\underline{L}_r(s'(s;c)+b) - \pi(s'(s;c)+b;c)]$$

On the other hand, since $L(s)$ is the optimal value, for all s:

$$E_c[\pi(s;c)] \geq L(s) \geq \underline{L}_r(s)$$

It follows that:

$$0 \geq \underline{L}_r(s^0) - E_c[\pi(s^0;c)] \geq \lambda^i (E[\underline{L}_r(S^i)] - E[\pi(S^i;c)])$$

where $S^i$ denotes the state that is reached after i steps, while implementing the policy $x(.)$, so the expectation is taken over all the random parameters involved. If the state space is bounded, the sequence $E[\underline{L}(S^i) - \pi(S^i;c^i)]$ is also bounded and, if $\lambda < 1$, it follows that $\underline{L}_r(s^0) = E_c[\pi(s^0;c)] = L(s^0)$.

Learning the Value Function

The value function can be approximated successively. Iterations of the successive approximation algorithm can be executed both during the preprocessing phase, while simulating random state transitions, and also while the MDP itself is running in real time. In such simulations, actions are chosen based on the currently known approximations from above and from below. It is important to note that, for the sake of running the MDP optimally, there is no need to know the value function in its entirety. It suffices to know only the values of states that actually occur in the process and those that could occur if certain actions were taken, and even so, only the relative values are important for choosing the best action. In other words, sometimes values do not have to be known with high accuracy. Furthermore, knowledge of a lower bound on the value of one state and an upper bound on the value of another state may suffice for choosing the optimal action.

Suppose the system is currently in state s just before an action has to be chosen. An action can be chosen based on the approximation of $L(s')$ from above by solving (P2) or based on the approximation of L(s') from below by solving (P3). Moreover, a weighted average of the two approximate value function can be used by solving the following linear programming problem for some constant β and even analyze the sensitivity of the solution to β:

$$\text{Minimize}_{x, y, \xi} \quad c^T x + \beta \lambda f^T y + (1 - \beta) \lambda \xi \quad \text{(P4)}$$

$$\text{subject to} \quad Ax + Uy = s$$
$$\xi e - VMUy \geq g$$
$$MUy \geq a$$
$$Dx \geq a$$
$$e^T y = 1$$
$$y \geq 0$$

Suppose an action x is calculated as an optimal solution of one of the possible linear programming problems. Before an action x is actually executed, the resulting state s' can be further evaluated by running simulations with s' as the initial state and using any of the approximate value functions for computing actions. An approximate value function determines some policy, not necessarily optimal, so the simulation results provide an upper bound on the value of s'. Such a bound can be compared to the one derived by convexity from previously known states, and the state s' may be added to the list of states that are used for representing the approximation from above.

Logic of the Preferred Embodiment

Figure 2:
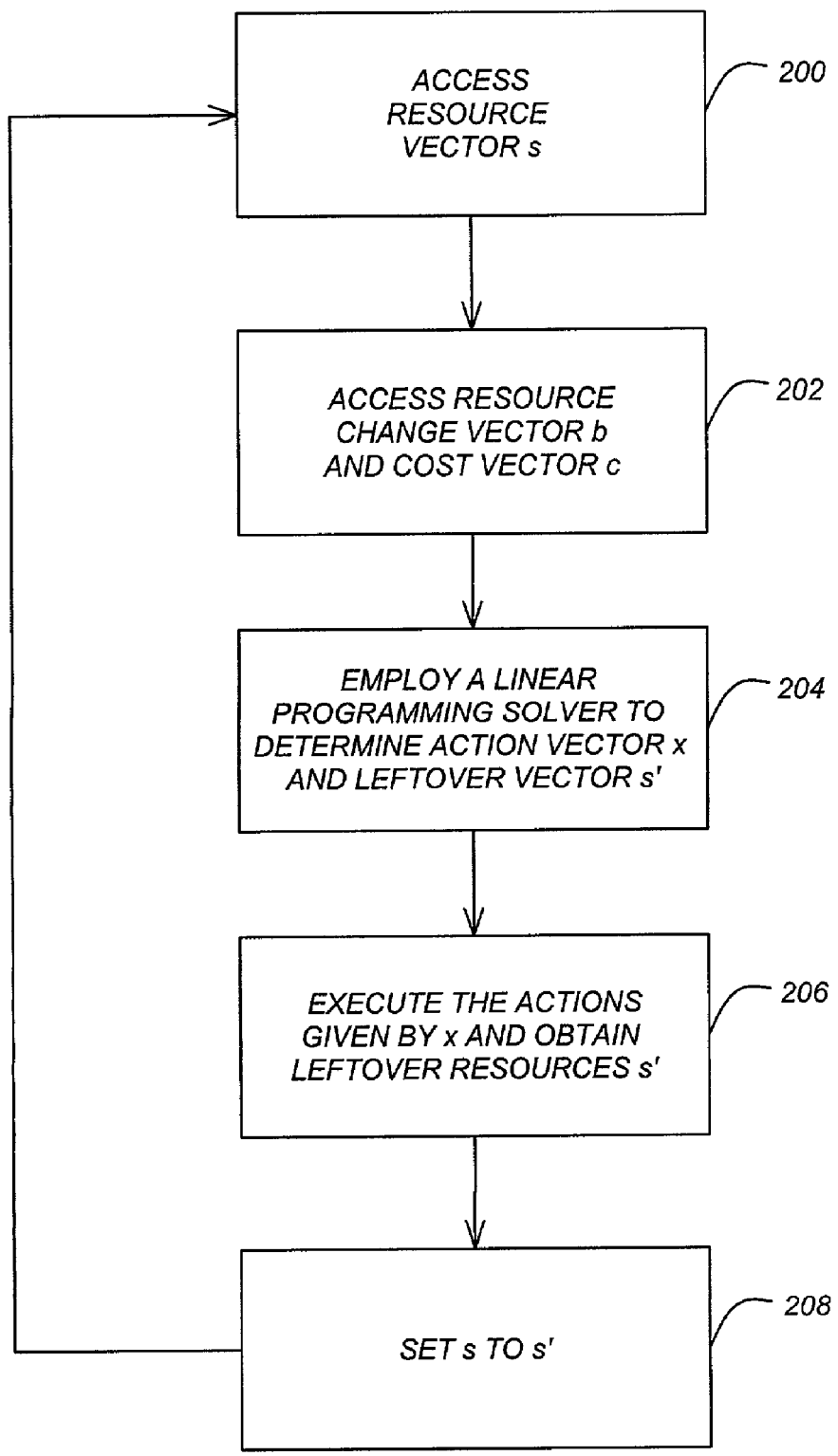
FIG. 2 is a flowchart that illustrates the general logic of a supply chain planning process according to the preferred embodiment of the present invention.

FIG. 2 is a flowchart that illustrates the general logic of a message or event-driven supply chain planning process 112 according to the preferred embodiment of the present invention. Specifically, the logic indicates how the supply chain planning process 112 derives optimal policies during its operation.

Block 200 represents the supply chain planning process 112 accessing a vector s of available resources, e.g., from a database 116, from another system, from a previous cycle of this process 112, etc. Note that supply chain management decisions are made cyclically, and thus Block 200 may represent the process 112 obtaining a vector of leftover resources from a previous cycle.

Block 202 represents the supply chain planning process 112 accessing a resource change vector b and a cost vector c, e.g., from a database 116, from another system, from a previous iteration of this process 112, etc. The vector b comprises additional resources that became available since the last cycle, and this vector b is added to the vector s.

Block 204 represents the supply chain planning process 112 employing a linear programming (LP) solver to compute a new action vector x. Specifically, the LP solver uses an approximate value function L(s') in a linear programming formulation to determine an action x, e.g., how much to produce from the available resources s. The problem is to determine the action x, not just to maximize the immediate profits by minimizing $c^T x$, but to take into account the value of the vector s of available resources remaining in anticipation of arrival of more resources.

As noted above, both the state space (i.e., the vector s) and the action space (i.e., X(s)) are continuous. Moreover, the state space and the action space are related to each other through a system of linear constraints, wherein one or more actions in the action space that are feasible in a state of the state space are linearly constrained with respect to the state.

Specifically, this Block builds one or more approximations from above and from below to a value function L(s) for the state s using representations that facilitate the computation of approximately optimal actions at any given state by linear programming. These approximations can be repeatedly refined in an iterative manner. The value function L(s) is convex, which means that it can be efficiently learned in advance and can be represented in a way that allows for real-time choice of actions based on it. Once the value function L(s) is approximated, an action x can be selected.

Block 206 represents the supply chain planning process 112 executing the actions described by the vector x, wherein the vector s' represents the leftover resources remaining after the actions described by the vector x have been performed.

Block 208 represents the supply chain planning process 112 setting the vector s to the vector s' for the next cycle. Thereafter, control transfers back to Block 200.

REFERENCES

The following references are incorporated by reference herein:

1. Bellman, R., *Dynamic Programming*, Princeton University Press (1957).
2. Filar, J. A. and Vrieze, K., *Competitive Markov Decision Processes*, Springer-Verlag (1996).
3. Gordon, J. G., *Approximate Solutions to Markov Decision Processes*, Doctoral dissertation, School of Computer Science, Carnegie-Mellon University (1999).
4. Puterman, M. L., *Markov Decision Processes: Discrete Stochastic Dynamic Programming*, John Wiley and Sons (1994).
5. Trick, M. A. and Zin, S. E., *Spline approximation to value function: A linear programming approach*, Macroeconomic Dynamics, vol. 1, pp. 255–277 (1997).

CONCLUSION

This concludes the description of the preferred embodiment of the invention. In summary, the present invention discloses a method, apparatus, and article of manufacture for solving stochastic control problems of linear systems in high dimensions by modeling a structured Markov Decision Process (MDP). A state space for the MDP is a polyhedron in a Euclidean space and one or more actions that are feasible in a state of the state space are linearly constrained with respect to the state. One or more approximations are built from above and from below to a value function for the state using representations that facilitate the computation of approximately optimal actions at any given state by linear programming.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for solving, in a computer, stochastic control problems of linear systems in high dimensions, comprising:
   (a) modeling, in the computer, a structured Markov Decision Process (MDP), wherein a state space for the MDP is a polyhedron in a Euclidean space and one or more actions that are feasible in a state of the state space are linearly constrained with respect to the state; and (b) building, in the computer, one or more approximations from above and from below to a value function for the state using representations that facilitate the computation of approximately optimal actions at any given state by linear programming.

2. The method of claim 1, wherein the MDP comprises a supply chain planning process.

3. The method of claim 1, wherein the action space and the state space are continuous and related to each other through a system of linear constraints.

4. The method of claim 1, wherein the value function is convex and the method further comprises efficiently learning the value function in advance and representing the value function in a way that allows for real-time choice of actions based thereon.

5. The method of claim 1, wherein the linear function is approximated both from above and from below by piecewise linear and convex functions.

6. The method of claim 5, wherein the domains of linearity of the piecewise linear and convex functions are not stored explicitly, but rather are encoded through a linear programming formulation.

7. The method of claim 5, wherein the domains of linearity of the piecewise linear and convex functions allow the functions to be optimized and updated in real-time.

8. The method of claim 1, wherein the value function can be efficiently approximated both from above and from below.

9. The method of claim 1, wherein the approximations can be repeatedly refined.

10. The method of claim 1, wherein the value function can be efficiently approximated from above based on knowledge of upper bounds on the function at each member of a selected set of states.

11. The method of claim 1, wherein the value function can be efficiently approximated from below based on linear functions that lie below the convex value function.

12. The method of claim 1, wherein the value function can be approximated successively.

13. A computer apparatus for solving stochastic control problems of linear systems in high dimensions, comprising:

(a) a computer;

(b) logic, performed by the computer, for modeling a structured Markov Decision Process (MDP), wherein a state space for the MDP is a polyhedron in a Euclidean space and one or more actions that are feasible in a state of the state space are linearly constrained with respect to the state; and (c) logic, performed by the computer, for building one or more approximations from above and from below to a value function for the state using representations that facilitate the computation of approximately optimal actions at any given state by linear programming.

14. The apparatus of claim 13, wherein the MDP comprises a supply chain planning process.

15. The apparatus of claim 13, wherein the action space and the state space are continuous and related to each other through a system of linear constraints.

16. The apparatus of claim 13, wherein the value function is convex and the logic further comprises efficiently learning the value function in advance and representing the value function in a way that allows for real-time choice of actions based thereon.

17. The apparatus of claim 13, wherein the linear function is approximated both from above and from below by piecewise linear and convex functions.

18. The apparatus of claim 17, wherein the domains of linearity of the piecewise linear and convex functions are not stored explicitly, but rather are encoded through a linear programming formulation.

19. The apparatus of claim 17, wherein the domains of linearity of the piecewise linear and convex functions allow the functions to be optimized and updated in real-time.

20. The apparatus of claim 13, wherein the value function can be efficiently approximated both from above and from below.

21. The apparatus of claim 13, wherein the approximations can be repeatedly refined.

22. The apparatus of claim 13, wherein the value function can be efficiently approximated from above based on knowledge of upper bounds on the function at each member of a selected set of states.

23. The apparatus of claim 13, wherein the value function can be efficiently approximated from below based on linear functions that lie below the convex value function.

24. The apparatus of claim 13, wherein the value function can be approximated successively.

25. An article of manufacture embodying a computer readable medium storing a computer program comprising computer executable instructions, which when executed by a computer perform a process for solving stochastic control problems of linear systems in high dimensions, the computer program comprising instructions for:

(a) modeling a structured Markov Decision Process (MDP), wherein a state space for the MDP is a polyhedron in a Euclidean space and one or more actions that are feasible in a state of the state space are linearly constrained with respect to the state; and (b) building one or more approximations from above and from below to a value function for the state using representations that facilitate the computation of approximately optimal actions at any given state by linear programming.

26. The article of manufacture of claim 25, wherein the MDP comprises a supply chain planning process.

27. The article of manufacture of claim 25, wherein the action space and the state space are continuous and related to each other through a system of linear constraints.

28. The article of manufacture of claim 25, wherein the value function is convex and the logic further comprises efficiently learning the value function in advance and representing the value function in a way that allows for real-time choice of actions based thereon.

29. The article of manufacture of claim 25, wherein the linear function is approximated both from above and from below by piecewise linear and convex functions.

30. The article of manufacture of claim 29, wherein the domains of linearity of the piecewise linear and convex functions are not stored explicitly, but rather are encoded through a linear programming formulation.

31. The article of manufacture of claim 29, wherein the domains of linearity of the piecewise linear and convex functions allow the functions to be optimized and updated in real-time.

32. The article of manufacture of claim 25, wherein the value function can be efficiently approximated both from above and from below.

33. The article of manufacture of claim 25, wherein the approximations can be repeatedly refined.

34. The article of manufacture of claim 25, wherein the value function can be efficiently approximated from above based on knowledge of upper bounds on the function at each member of a selected set of states.

35. The article of manufacture of claim 25, wherein the value function can be efficiently approximated from below based on linear functions that lie below the convex value function.

36. The article of manufacture of claim 25, wherein the value function can be approximated successively.

* * * * *